(12) United States Patent
Kitsuki

(10) Patent No.: US 11,943,405 B2
(45) Date of Patent: Mar. 26, 2024

(54) IMAGE READING APPARATUS

(71) Applicant: SEIKO EPSON CORPORATION, Tokyo (JP)

(72) Inventor: Hiromichi Kitsuki, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/311,729

(22) Filed: May 3, 2023

(65) Prior Publication Data

US 2023/0276004 A1 Aug. 31, 2023

Related U.S. Application Data

(63) Continuation of application No. 17/938,563, filed on Oct. 6, 2022, now Pat. No. 11,677,884, which is a continuation of application No. 16/674,204, filed on Nov. 5, 2019, now Pat. No. 11,477,337.

(30) Foreign Application Priority Data

Nov. 7, 2018 (JP) .................. 2018-209830

(51) Int. Cl.
*G06F 5/00* (2006.01)
*H04N 1/00* (2006.01)
*G06F 15/00* (2006.01)

(52) U.S. Cl.
CPC ..... *H04N 1/00702* (2013.01); *H04N 1/00482* (2013.01); *H04N 1/00591* (2013.01); *H04N 1/00602* (2013.01); *H04N 1/00615* (2013.01); *H04N 1/00777* (2013.01); *H04N 1/00718* (2013.01)

(58) Field of Classification Search
None
See application file for complete search history.

(56) References Cited

U.S. PATENT DOCUMENTS

| | | |
|---|---|---|
| 2003/0042300 A1 | 3/2003 | So |
| 2016/0261758 A1 | 9/2016 | Kimura |
| 2017/0315491 A1 | 11/2017 | Kawamura |
| 2019/0104228 A1 | 4/2019 | Arimori et al. |

(Continued)

FOREIGN PATENT DOCUMENTS

| | | |
|---|---|---|
| JP | 2005-178268 | 7/2005 |
| JP | 2008-011363 | 1/2008 |
| JP | 2010-105755 | 5/2010 |

(Continued)

*Primary Examiner* — Mark R Milia
(74) *Attorney, Agent, or Firm* — WORKMAN NYDEGGER

(57) ABSTRACT

An image reading apparatus includes a feed roller configured to feed a document, a transport roller disposed downstream of the feed roller and configured to transport the document downstream; a transport motor being a drive source of the transport roller; a reading unit disposed downstream of the transport roller and configured to read the document; and a control unit configured to control the reading unit and the transport motor, wherein the control unit is configured to obtain information on a document type and an inclination detection reference value for an inclination of image data set in accordance with the document type and obtained from the reading unit, and when the inclination of the image data exceeds the inclination detection reference value in accordance with the document type, the control unit stops the transport motor.

8 Claims, 8 Drawing Sheets

(56) References Cited

U.S. PATENT DOCUMENTS

2019/0112139 A1    4/2019  Hirayama et al.

FOREIGN PATENT DOCUMENTS

| | | |
|---|---|---|
| JP | 2016-001795 | 1/2016 |
| JP | 2016-015589 | 1/2016 |
| JP | 2019-068175 | 4/2019 |
| JP | 2019-075600 | 5/2019 |
| WO | 2015/097814 | 7/2015 |

FIG. 6

| USE | UI DISPLAY | LOAD DETECTION REFERENCE VALUE | INCLINATION DETECTION REFERENCE VALUE |
|---|---|---|---|
| PLAIN PAPER, THICK PAPER | GENERAL DOCUMENT | HIGH | HIGH |
| THIN PAPER | THIN GENERAL DOCUMENT | LOW | HIGH |
| HORIZONTALLY LONG THIN PAPER SUCH AS A5 SIZE HORIZONTAL: FOR EXAMPLE, DELIVERY SLIPS AND BANK APPLICATION DOCUMENTS | HORIZONTALLY LONG SLIPS | LOW | MEDIUM |
| VERTICALLY LONG THIN PAPER SUCH AS A4 SIZE VERTICAL: FOR EXAMPLE, APPLICATION DOCUMENTS FOR PUBLIC OFFICES, HOSPITALS, AND THE LIKE | VERTICALLY LONG APPLICATION DOCUMENTS AND CERTIFICATES | LOW | LOW |

IMAGE READING APPARATUS

This application is a continuation application of U.S. patent application Ser. No. 17/938,563, filed Oct. 6, 2022, which is a continuation application of U.S. patent application Ser. No. 16/674,204, filed Nov. 5, 2019, and granted on Oct. 18, 2022, as U.S. Pat. No. 11,477,337, which claims the benefit of and priority to JP Application Serial Number 2018-209830, filed Nov. 7, 2018. The entire disclosures of the above-mentioned applications are hereby incorporated herein by reference.

BACKGROUND

1. Technical Field

The present disclosure relates to an image reading apparatus that reads an image of a document.

2. Related Art

In the following, a description will be given of the present disclosure by taking a scanner, which is one type of image reading apparatuses, as an example. Some of scanners are provided with a document feeder that automatically feeds documents so as to automatically feed and read a plurality of documents. The document feeder is sometimes referred to as an ADF (Auto document Feeder).

The document feeder includes a document tray on which a plurality of documents are mounted, a feed roller that rotates in contact with the document set in the document tray so as to feed the document from the document tray, and a separation roller that keeps in contact with the feed roller so as to separate the document. A transport roller that performs precision feed on the document is disposed downstream of the document feeder, and a reader that reads an image of the document is disposed further downstream of the transport roller.

Here, a transport abnormality, specifically a jam sometimes occurs in the document transport path of a scanner, and thus jam detection has been performed by various methods to date. As an example, JP-A-2008-11363 discloses an example of a technique for detecting an inclination of a document based on read image data, and eventually preventing a jam. Hereinafter a method for detecting an inclination of a document in order to prevent a jam is referred to as an inclination detection method.

A document tray is normally provided with edge guides that guide both sides of a document. When a document is inclined, one of the edges of the document is pressed against the corresponding one of the edge guides. This situation sometimes results in deformation of the document and may cause a jam. The occurrence of such a jam depends on the type of the document. In the related-art inclination detection method, a reference value, namely, a threshold value for detecting an inclination is fixed regardless of the document type. Accordingly, a document which is originally unlikely to cause a jam has sometimes been mistakenly determined to have an abnormality.

SUMMARY

According to an aspect of the present disclosure, there is provided an image reading apparatus including: a document mounting section configured to mount a document; a feed roller configured to feed the document from the document mounting section; a transport roller disposed downstream of the feed roller and configured to transport the document downstream; a transport motor being a drive source of the transport roller; a reading unit disposed downstream of the transport roller and configured to read the document; and a control unit configured to control the reading unit and the transport motor, wherein the control unit is configured to obtain information on a document type, and an inclination detection reference value for an inclination of image data set in accordance with the document type and obtained from the reading unit, and when the inclination of the image data exceeds the inclination detection reference value in accordance with the document type, the control unit stops the transport motor.

BRIEF DESCRIPTION OF THE DRAWINGS

FIG. 6 is a table illustrating reference value setting for load detection and inclination detection for each document type.

DESCRIPTION OF EXEMPLARY EMBODIMENTS

Figure 1:
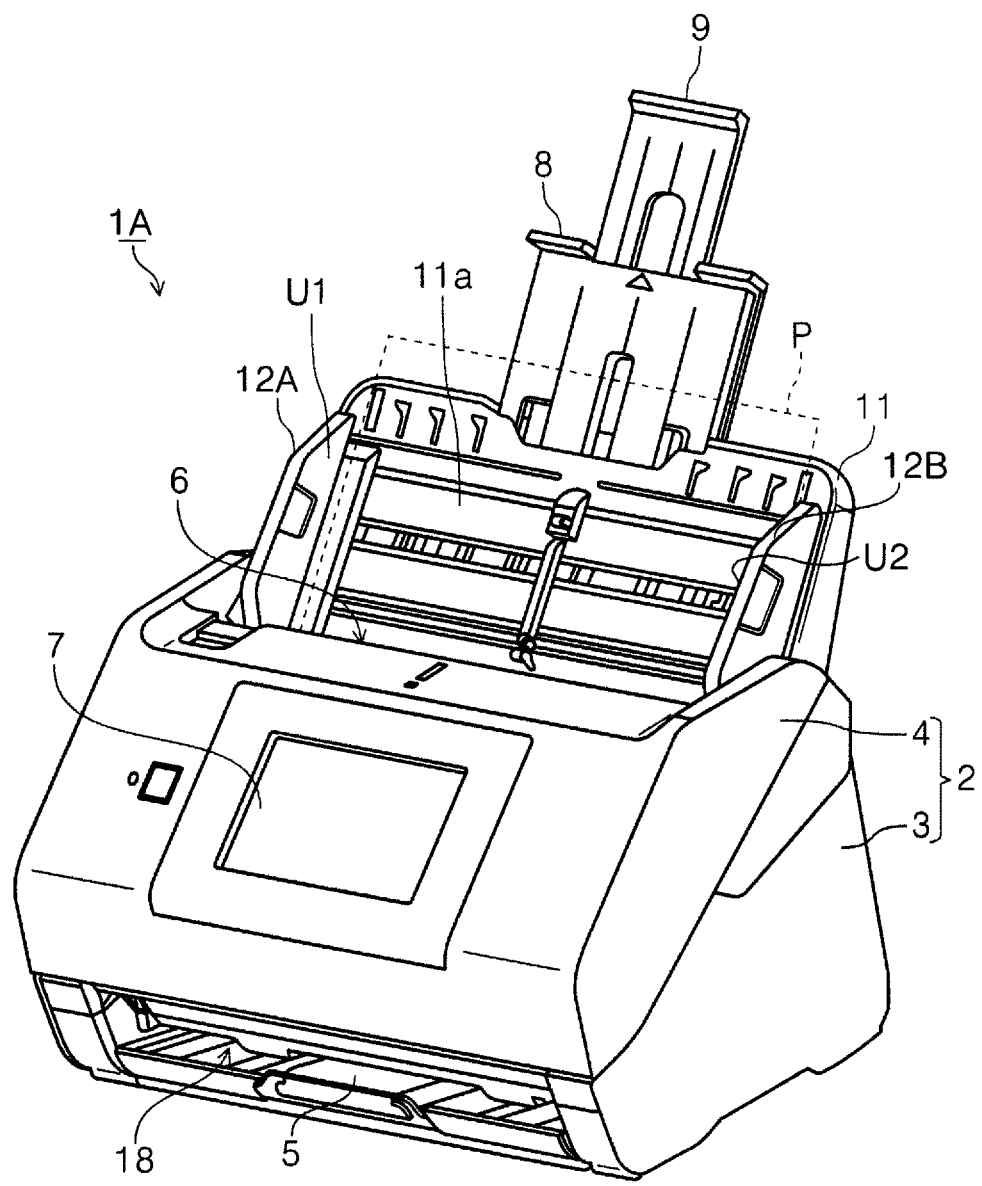
FIG. 1 is an outer perspective view of a scanner.

In the following, a description will be schematically given of the present disclosure. An image reading apparatus according to a first aspect includes: a document mounting section configured to mount a document; a feed roller configured to feed the document from the document mounting section; a transport roller disposed downstream of the feed roller and configured to transport the document downstream; a transport motor being a drive source of the transport roller; a reading unit disposed downstream of the transport roller and configured to read the document; and a control unit configured to control the reading unit and the transport motor, wherein the control unit is configured to obtain information on a document type and an inclination detection reference value for an inclination of image data set in accordance with the document type and obtained from the reading unit, and when the inclination of the image data exceeds the inclination detection reference value in accordance with the document type, the control unit stops the transport motor.

With this aspect, the control unit is configured to obtain information on a document type and an inclination detection reference value for an inclination of image data set in accordance with the document type and obtained from the reading unit, and when the inclination of the image data exceeds the inclination detection reference value in accordance with the document type, the control unit stops the transport motor. Accordingly, by using an inclination detection reference value in accordance with the document type, it is possible to suppress erroneous determination in which a document that is originally unlikely to cause a jam is mistakenly determined to have an abnormality. In this regard, when saying simply "erroneous determination", it refers to making a determination of transport abnormality in spite of the state in which the document is allowed to be transported.

According to a second aspect, the inclination detection reference value may become higher as a transport direction length of the document is shorter in the first aspect. When the transport direction length of the document is short, the edges of the document take a short time in contacting the edge guides or the side walls of the path, and thus a transport abnormality is unlikely to occur. With this aspect, the inclination detection reference value is higher as a transport direction length of the document is shorter, and thus it is possible to suppress erroneous determination on a document that is unlikely to cause a transport abnormality and to serve the convenience of a user.

According to a third aspect, the image reading apparatus according to the first aspect may further include edge guides disposed with a gap therebetween in a width direction intersecting a document feed direction and configured to guide width direction edges of the document mounted on the document mounting section, wherein the document type may include a first document having a back end in the transport direction in length located upstream out from a back end of the edge guide in the transport direction when mounted on the document mounting section and a second document having a back end in the transport direction in length located downstream from the back end of the edge guide in the transport direction when mounted on the document mounting section, and the inclination detection reference value for the second document may be higher than the inclination detection reference value for the first document.

The first document, which has a back end in the transport direction in length located upstream out from a back end of the edge guide in the transport direction when mounted on the document mounting section, has a long time in contacting the edge guides, and thus a transport abnormality is likely to occur. On the contrary, the second document, which has a back end in the transport direction in length located downstream from the back end of the edge guide in the transport direction when mounted on the document mounting section, has a shorter time in contacting the edge guide than the first document, and thus a transport abnormality is unlikely to occur. With this aspect, the inclination detection reference value for the second document is higher than the inclination detection reference value for the first document, and thus it is possible to suppress erroneous determination on the second document, which is more unlikely to cause a transport abnormality relatively than the first document, and to serve the convenience of a user.

According to a fourth aspect, the image reading apparatus according to any one of the first to the third aspects, wherein the control unit may be configured to obtain a load detection reference value for a load torque of the transport motor set in accordance with the document type in addition to the inclination detection reference value, and when an inclination of the image data exceeds the inclination detection reference value in accordance with the document type or when the load torque exceeds the load detection reference value in accordance with the document type, the control unit may stop the transport motor.

With this aspect, at the time of detecting a transport abnormality, a load detection method in which a transport abnormality is determined by using the load torque of the transport motor is used in combination in addition to the inclination detection method. Accordingly, it is possible to handle the case of a transport abnormality without involving a document inclination and to reliably suppress giving damage to the document in association with a transport abnormality.

According to a fifth aspect, in the fourth aspect, the load detection reference value may become higher as a rigidity of the document is higher. The higher the rigidity of a document, the higher the load torque at normal transport time is likely to become. With this aspect, the higher the rigidity of a document, the higher the load detection reference value, and thus it is possible to suppress erroneous determination for a document having a high rigidity.

According to a sixth aspect, the image reading apparatus according to the fourth or fifth aspect may further include an input reception section configured to receive an instruction input from a user, wherein the control unit may change between an abnormality determination execution mode in which stop control of the transport motor is performed in accordance with the inclination of the image data and the load torque based on information set via the input reception section, and an abnormality determination hold mode in which stop control of the transport motor is not performed in accordance with the inclination of the image data and the load torque.

With this aspect, in accordance with an instruction input from a user, the control unit changes between an abnormality determination execution mode in which stop control of the transport motor is performed in accordance with the inclination of the image data and the load torque and an abnormality determination hold mode in which stop control of the transport motor is not performed in accordance with the inclination of the image data and the load torque. Accordingly, it is possible to handle the case of not demanding an abnormality determination and to improve the convenience of a user.

According to a seventh aspect, in the sixth aspect, when the control unit receives a read execution instruction of a document in the abnormality determination execution mode, the control unit may display a user interface for setting a document type in the input reception section.

With this aspect, when the control unit receives a read execution instruction of a document in the abnormality determination execution mode, the control unit displays a user interface for setting a document type in the input reception section. As a result, it is possible for the control unit to correctly obtain the information on the document type and to reliably suppress an erroneous determination.

According to an eighth aspect, the image reading apparatus according to any one of the fourth to the sixth aspects may further include a medium detection section including a transmission section that transmits an ultrasonic wave and a reception section that receives the ultrasonic wave transmitted from the transmission section and outputs an output value in accordance with the received ultrasonic wave to the control unit between the feed roller and the transport roller in a document transport path, wherein the control unit may adjust the load detection reference value in accordance with the output value.

The thicker a document, the higher the rigidity of the document. It is possible to detect the difference in the thickness of a document by using an ultrasonic wave. In this aspect, the load detection reference value is adjusted in accordance with the output value in response to the ultrasonic wave using such a characteristic. Accordingly, it is possible to suppress an erroneous determination without inputting information on the document type by a user, and to improve the convenience of a user.

In the following, the present disclosure will be specifically described. A description will be given of an image reading apparatus according to an embodiment of the present disclosure with reference to the drawings. In the present embodiment, as an example of the image reading apparatus, a description will be given of a document scanner (hereinafter simply referred to as a scanner 1A) configured to read at least one of the front face and the back face of a document P.

In this regard, in the X-Y-Z coordinate system illustrated in each diagram, the X-direction is the width direction of the apparatus and is also the document width direction, which intersects the document feed direction (transport direction). Also, the Y-direction is the document feed direction (transport direction). The Z-direction is the direction that intersects the Y-direction and roughly indicates the direction perpendicular to the face of the document P to be transported. Also, it is assumed that +Y-direction is the direction heading from the back face to the front face of the apparatus, and −Y-direction is the direction heading from the front face to the back face of the apparatus. Also, it is assumed that the left direction seen from the apparatus front face is +X-direction, and the right direction is −X-direction. Also, it is assumed that +Z-direction is the up direction of the apparatus, and −Z-direction is the down direction of the apparatus. Also, it is assumed that the direction (+Y-direction) in which the document P is fed is referred to as "downstream", and the opposite direction (−Y-direction) to this is referred to as "upstream".

FIG. 1 is an outer perspective view of the scanner 1A according to the present disclosure. The scanner 1A includes an apparatus body 2 that includes a reader 20 (FIG. 2) for reading an image of the document P inside. The apparatus body 2 includes a lower unit 3 and an upper unit 4. The upper unit 4 is disposed so as to be openable and closable with respect to the lower unit 3 with a downstream point in the document transport direction as a rotation fulcrum. It is possible to open the upper unit 4 by rotating the upper unit 4 in the front face direction of the apparatus and to expose the document transport path of the document P so as to easily handle the jam of the document P.

A document mounting section 11 having a mounting face 11a on which the document P to be fed is mounted is disposed close to the apparatus back face of the apparatus body 2. The document mounting section 11 is detachably disposed with respect to the apparatus body 2. Also, the document mounting section 11 is provided with a pair of edge guides, specifically, a first edge guide 12A and a second edge guide 12B that guide the side edges of the document P in the width direction (X-axis direction) of the feed direction (Y-axis direction) of the document P. The first edge guide 12A and the second edge guide 12B include guide faces U1 and U2 respectively that guide the corresponding side edges of the document P. In this regard, hereinafter when it is not necessary to distinguish the first edge guide 12A and the second edge guide 12B in particular, the pair of edge guides is sometimes referred to simply as an "edge guide 12" or a "pair of edge guides 12".

The document mounting section 11 includes a first paper support 8 and a second paper support 9. It is possible to store the first paper support 8 and the second paper support 9 inside the document mounting section 11, to pull out the first paper support 8 and the second paper support 9 from the document mounting section 11 as illustrated in FIG. 1, and to adjust the length of the mounting face 11a.

The apparatus body 2 includes, on the apparatus front face of the upper unit 4, an operation panel 7 that enables a user interface (UI) by which various reading settings and reading operations are performed, and reading setting contents, and the like are displayed. In the present embodiment, the operation panel 7 is a so-called touch panel that enables both display and input operations. The operation panel 7 serves both an operation section for performing various operations and a display section for displaying various kinds of information. A feed opening 6 that connects to the inside of the apparatus body 2 is disposed at the upper part of the upper unit 4, and the document P mounted on the document mounting section 11 is transported from the feed opening 6 to the reader 20 disposed inside the apparatus body 2. Also, a paper discharge tray 5 that receives the discharged document P is disposed on the apparatus front face of the lower unit 3.

Figure 2:
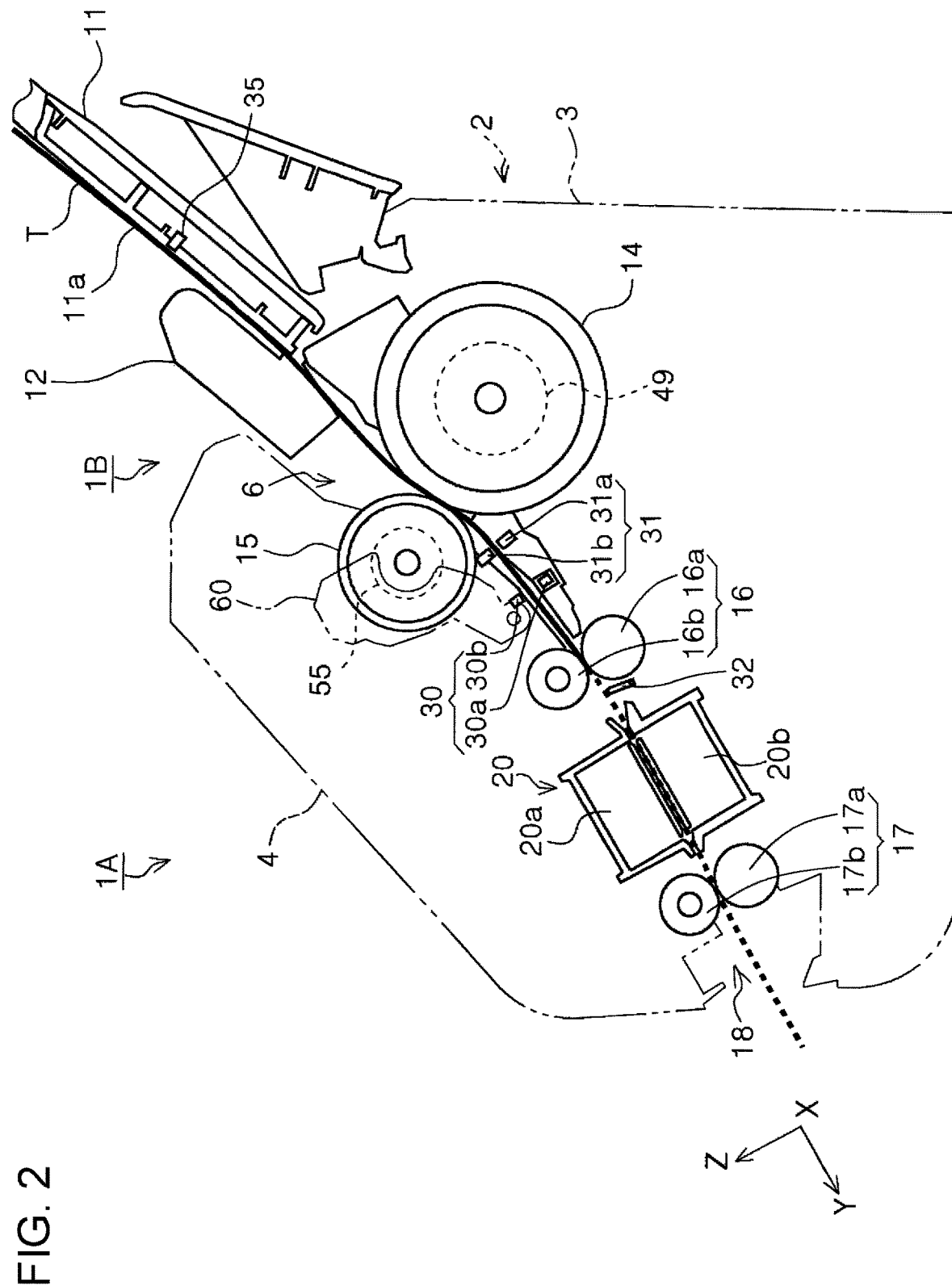
FIG. 2 is a sectional side view illustrating a document transport path in the scanner.
Figure 3:
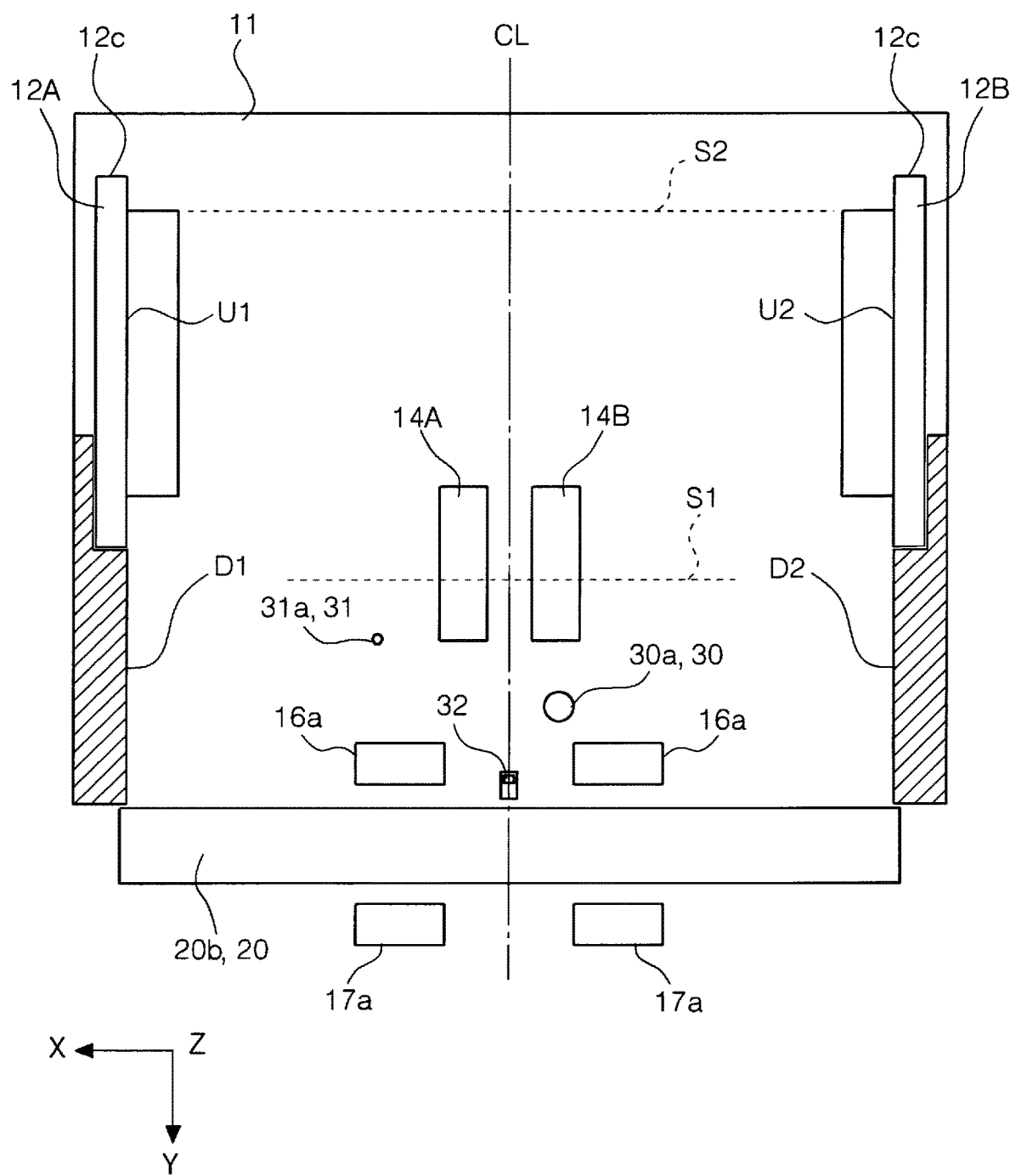
FIG. 3 is a plan view illustrating the document transport path in the scanner.

Next, a description will be given of the document feed path in the scanner 1A with reference to FIG. 2 and FIG. 3. FIG. 2 is a sectional side view illustrating the document feed path in the scanner 1A according to the present disclosure, and FIG. 3 is a plan view thereof. The scanner 1A includes a document feeder 1B. A sign T denoted by a solid line in FIG. 2 indicates the document feed path, in other words, the passing locus of the document P. The document feed path T is a space sandwiched by the lower unit 3 and the upper unit 4. In this regard, since it is possible to define the document feed path T as a path from the document mounting section 11 to a pair of transport rollers 16, the downstream path of document from the pair of transport rollers 16 is denoted by a broken line in FIG. 2. The path denoted by the broken line, that is to say, the downstream path from the pair of transport rollers 16 is hereinafter referred to as a downstream path Q.

The uppermost stream of the document feed path T is provided with the document mounting section 11. The downstream of the document mounting section 11 is provided with a feed roller 14 that transports the document P mounted on the mounting face 11a of the document mounting section 11 to the reader 20 and a separation roller 15 that nips and separates the document P from the feed roller 14. The document mounting section 11 is provided with the edge guide 12 described above.

The feed roller 14 comes in contact with the lowermost part of the document P mounted on the mounting face 11a of the document mounting section 11. Accordingly, when a plurality of pieces of the document P is set in the document mounting section 11 in the scanner 1A, a piece of the document P on the side of the mounting face 11a is fed downstream in order. In this regard, the document mounting section 11 is provided with a mounting detection section 35 for detecting whether or not the document P exists on the document mounting section 11 as a mounting detection unit.

As illustrated in FIG. 3, in the present embodiment, the feed roller 14 includes two rollers such that the rollers are line symmetrical with respect to a center position CL in the document width direction. In FIG. 3, the feed roller 14 on the left side of the center position CL is denoted by a sign 14A, and the feed roller 14 on the right side of the center position CL is denoted by a sign 14B. Although illustration is omitted in FIG. 3, in the same manner, the separation roller 15 also includes two rollers such that the rollers are line symmetrical with respect to the center position CL.

Figure 4:
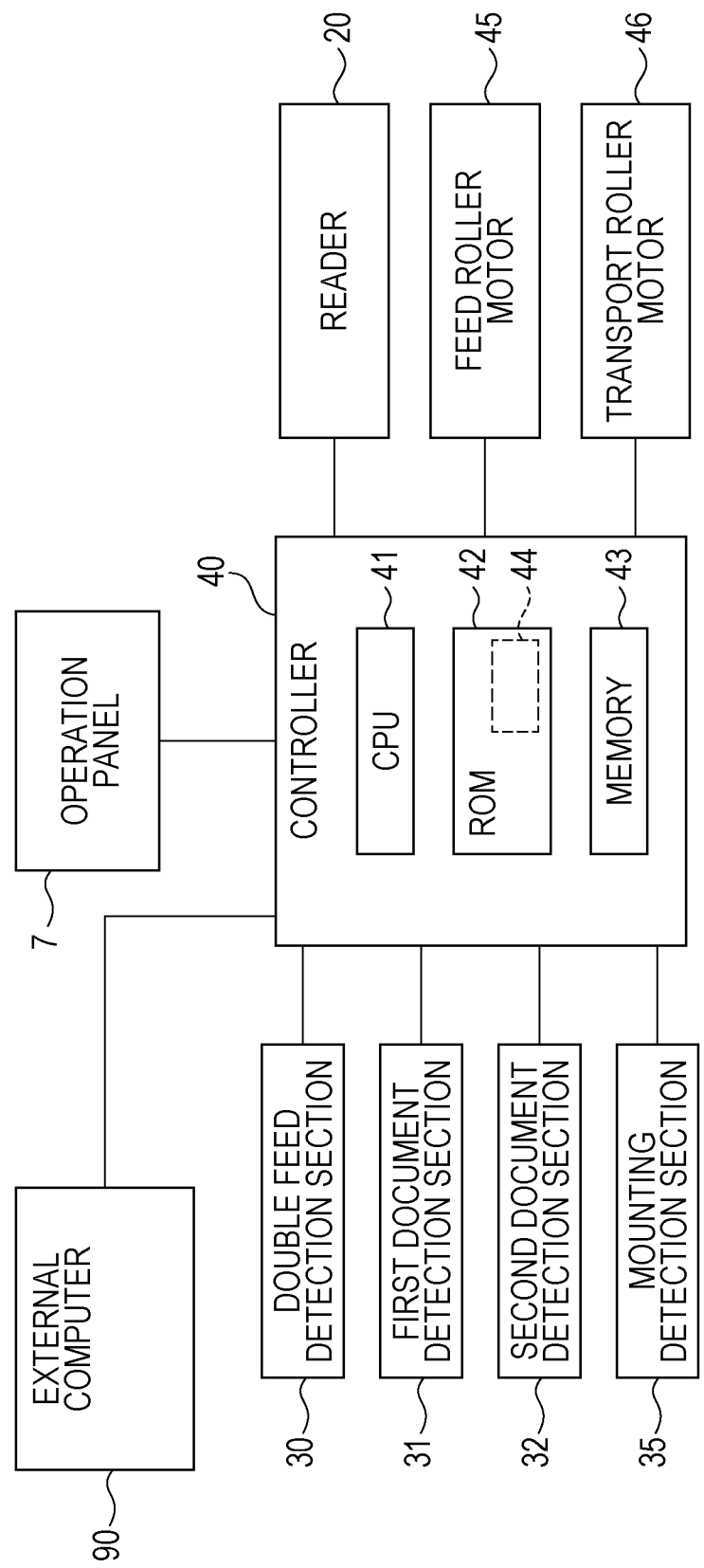
FIG. 4 is a block diagram illustrating a control system of the scanner.

The feed roller 14 is rotary driven by a feed roller motor 45 (FIG. 4). The feed roller 14 is rotated counterclockwise in FIG. 2 by being applied a rotational torque by the feed roller motor 45. A transport roller motor 46 (FIG. 4) transmits a rotational torque to the separation roller 15 via a torque limiter not illustrated in the figure.

When the document P does not exist between the feed roller 14 and the separation roller 15, or when only one sheet lies therebetween, a slip occurs in the torque limiter not illustrated in the figure. Thereby the separation roller 15 is rotary driven (in the clockwise direction in FIG. 2) in spite of the rotational torque applied by the transport roller motor 46. When the second or later sheet of the document P is further caught between the feed roller 14 and the separation roller 15 in addition to a sheet of the document P to be fed, a slip occurs among the sheets of the document. Accordingly, the separation roller 15 is rotated in the counterclockwise direction in the FIG. 2 by the rotational torque applied by the transport roller motor 46. Thereby, double feed of the document P is prevented.

The downstream of the feed roller 14 is provided with the pair of transport rollers 16 as a transport roller, the reader 20 that reads an image, and a pair of discharge rollers 17. The pair of transport rollers 16 includes a transport drive roller 16a that is rotary driven by the transport roller motor 46 (FIG. 4) as a transport motor, and a transport driven roller 16b that is rotary driven. In the present embodiment, as illustrated in FIG. 3, the transport drive roller 16a includes two rollers such that the rollers are line symmetrical with respect to the center position CL. Although the transport driven roller 16b is omitted in FIG. 3, the transport driven roller 16b also includes two rollers such that the rollers are line symmetrical with respect to the center position CL in the same manner. The document P that has been nipped by the feed roller 14 and the separation roller 15, and has been fed downstream is nipped by the pair of transport rollers 16, and is transported to the reader 20 located downstream of the pair of transport rollers 16.

In this regard, a first document detection section 31 is disposed downstream of the feed roller 14. The first document detection section 31 includes an optical sensor as an example, and includes a light emitter 31a and a light receiver 31b that are disposed opposite to each other by sandwiching the document feed path T. The light receiver 31b transmits an electronic signal indicating the intensity of detection light to the controller 40 (FIG. 4). The transported document P blocks the detection light emitted from the light emitter 31a so that an electronic signal indicating the intensity of the detection light changes. Thereby it is possible for the controller 40 (FIG. 4) to detect the passing of the document P at the front end or the back end.

Also, a double feed detection section 30 that detects double feed of the document P is disposed downstream of the first document detection section 31. The double feed detection section 30 includes an ultrasonic transmitter 30a and an ultrasonic receiver 30b for receiving an ultrasonic wave, which are disposed opposite to each other by sandwiching the document feed path T. The ultrasonic receiver 30b transmits an output value in accordance with the intensity of the detected ultrasonic wave to the controller 40 (FIG. 4). When double feed of the document P occurs, the electronic signal indicating the intensity of the ultrasonic wave changes, and thereby, it is possible for the controller 40 (FIG. 4) to detect double feed of the document P.

Also, a second document detection section 32 is disposed downstream of the double feed detection section 30. The second document detection section 32 is configured as a contact type sensor having a lever. When the lever is rotated by the document P passing the front end or the back end, the electronic signal transmitted from the second document detection section 32 to the controller 40 (FIG. 4) changes. Thereby, it is possible for the controller 40 (FIG. 4) to detect the document P passing the front end or the back end. It is possible for the controller 40 (FIG. 4) to obtain the position of the document P in the document feed path T by the first document detection section 31 and the second document detection section 32 described above.

Next, the reader 20 disposed downstream of the second document detection section 32 include an upper part reading sensor 20a disposed on the upper unit 4 and a lower part reading sensor 20b disposed on the lower unit 3. In the present embodiment, the upper part reading sensor 20a and the lower part reading sensor 20b includes a contact-type image sensor module (CISM), for example.

The image of at least one of the front face and the back face of the document P is read by the reader 20, and is nipped by the pair of discharge rollers 17 located downstream of the reader 20 and is discharged from a discharge opening 18 disposed on the apparatus front face of the lower unit 3. The pair of discharge rollers 17 includes a discharge drive roller 17a rotary driven by the transport roller motor 46 (FIG. 4) and a discharge driven roller 17b that is rotary driven. In the present embodiment, as illustrated in FIG. 3, the discharge drive roller 17a includes two rollers such that the rollers are line symmetrical with respect to the center position CL. Although not illustrated in FIG. 3, the discharge driven roller 17b also includes two rollers such that the rollers are line symmetrical with respect to the center position CL in the same manner.

Next, a description will be given of the position of the edge guide 12 with reference to FIG. 3. The first edge guide 12A and the second edge guide 12B are disposed at the left side and the right side respectively of the center position CL in the document width direction. In the present embodiment, the first edge guide 12A and the second edge guide 12B are configured to be displaced at respective positions that are always line symmetrical with respect to the center position CL by a rack and pinion mechanism not illustrated in the figure. It is also possible to hold the displaced positions by a holding unit not illustrated in the figure, for example, by a friction member or a serrated engagement unit.

In FIG. 3, signs D1 and D2 are respective guide faces of the path member forming the end parts of the medium feed path T in the medium width direction. In the present embodiment, the distance from the center position CL to the guide face D1 is the same as the distance from the center position CL to the guide face D2. In the present embodiment, when the gap between the first edge guide 12A and the second edge guide 12B is expanded most, the guide face U1 becomes substantially flush with the guide face D1, and the guide face U2 becomes substantially flush with the guide face D2.

In the present embodiment, the state in which the gap between the first edge guide 12A and the second edge guide 12B is expanded most is the state in which the gap between the guide face U1 and the guide face U2 becomes larger than the short side size of the document P that is assumed to have the largest size in designing the apparatus. In this regard, in the present embodiment, the largest document P assumed in designing the apparatus is the letter size. The letter size is a letter size defined by ANSI (American National Standards Institute) A and has a short side of 216 mm and a long side of 279 mm. In the present embodiment, the gap between the first edge guide 12A and the second edge guide 12B when the edge guide 12 is at the maximum guide position is set to 225 mm. Accordingly, the gap between the guide face D1 and the guide face D2 also becomes 225 mm. In this regard, instead of the letter size, the A4 size defined by ISO (International Organization for Standardization) 216 may be used as the largest document P assumed in designing the apparatus. The A4 size paper has a short side of 210 mm and a long side of 297 mm.

In this regard, the back face of the edge guide 12 is provided with a sensor for detecting the current position of each edge guide. It is possible for a controller 40 described later to detect the position of the edge guide 12 by a signal received from the sensor. In this regard, for the sensor, for example, it is possible to use an optical sensor that includes a linear scale extending in the displacement direction of the edge guide 12 and a sensor disposed on the edge guide 12 for detecting the linear scale.

In the following, a description will be given of the control system in the scanner 1A with reference to FIG. 4. FIG. 4 is a block diagram illustrating the control system of the scanner 1A according to the present disclosure. In FIG. 4, as the control unit, the controller 40 performs feed, transport, discharge control of the document P and read control in addition to the other various kinds of control of the scanner 1A. The controller 40 receives a signal input from the operation panel 7. The controller 40 also transmits a signal for realizing display of the operation panel 7 and particularly the user interface (UI) to the operation panel 7.

The controller 40 controls the feed roller motor 45 and the transport roller motor 46. As described above, the feed roller motor 45 is the drive source of the feed roller 14 illustrated in FIG. 2, and the transport roller motor 46 is the drive source of the separation roller 15, the pair of transport rollers 16, and the pair of discharge rollers 17 illustrated in FIG. 2. Both the feed roller motor 45 and the transport roller motor 46 are DC motors in the present embodiment. The controller 40 receives input of read data from the reader 20, and the controller 40 also transmits a signal for controlling the reader 20 to the reader 20. The controller 40 receives input of signals of detection units, such as the double feed detection section 30, the first document detection section 31, the second document detection section 32, and the mounting detection section 35.

The controller 40 includes a CPU 41, a ROM 42, and a memory 43. The CPU 41 performs various operation processing in accordance with a program 44 stored in the ROM 42 to control the operation of the entire scanner 1A. In this regard, the memory 43, which is an example of a storage section, is a nonvolatile memory capable of reading and writing, and stores necessary data for abnormality determination, and the like. In this specification, unless otherwise described in particular, it is assumed that necessary data for abnormality determination described later, necessary parameter for control, and the like are all stored in the memory 43, and the values thereof are updated by the controller 40 as necessary. Also, various kinds of setting information input by a user via the operation panel 7 is also stored in the memory 43. The program 44 stored in the ROM 42 does not necessarily mean one program, and includes a plurality of programs. The programs include a program for determining abnormality in the document feed path T, a program for changing threshold values described later, a program for controlling the UI displayed on the operation panel 7, various control programs necessary for transporting and reading the document P, and the like.

Also, the scanner 1A is configured to connect to the external computer 60, and the controller 40 receives input of information from the external computer 60. The external computer 60 includes a display section 62. On the display section 62, a user interface (UI) is realized by a control program in a storage unit included in the external computer 60, which is not illustrated in the figure.

Figure 7:
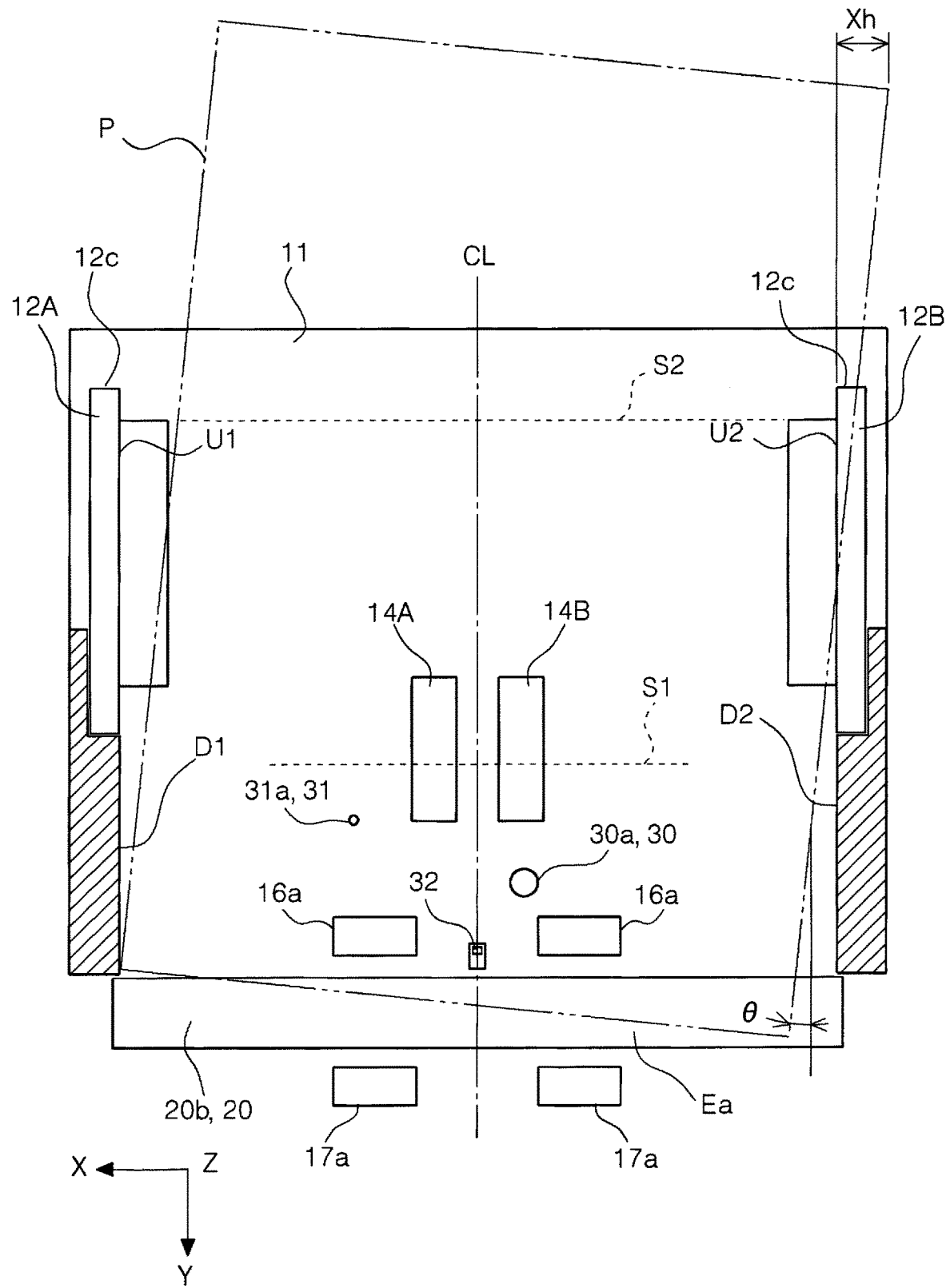
FIG. 7 is a plan view illustrating a state of a document inclination in the document transport path.

Next, a description will be given of abnormality determination related to the transport of the document P with reference to FIG. 5 and after that. The scanner 1A according to the present embodiment performs abnormality determination related to the transport of the document P by a combination of two detection methods, load detection and inclination detection. When the detection value exceeds a reference value in either one of the two methods, the transport of the document P is stopped as the occurrence of abnormality. Here, load detection refers to performing the detection of a drive current of the transport roller motor 46 (FIG. 4). This is based on the characteristic in which the drive torque of the pair of transport rollers 16, that is to say, the load torque of the transport roller motor 46 (FIG. 4) increases due to a jam of the document P. The drive current is indicated by the duty ratio of PWM control as an example. Also, inclination detection refers to performing analysis on the read data in the front end area (for example, about 10 mm in the transport direction length) of the document P when the document P reaches the reader 20 (FIG. 2 and FIG. 3) and performing the detection of the inclination of the document P. This is based on the characteristic in which when the document P has already a jam, or there is a high possibility of causing a jam in the future, the document P is inclined with respect to the transport path. In the present embodiment, the inclination of the document P is indicated by an inclination angle θ with respect to the transport direction as illustrated in FIG. 7.

In the following, a description will be given of the general flow of abnormality detection with reference to FIG. 5. When the controller 40 receives a scan execution instruction, the controller 40 determines whether or not an abnormality detection function is on (step S101). It is possible for a user to set the abnormality detection function on or off via the operation panel 7 (FIG. 1 and FIG. 4). Accordingly, when the abnormality detection function is set off (No in step S101), the abnormality detection processing is terminated. When the abnormality detection function is set on (Yes in step S101), a document type setting UI is displayed on the operation panel 7 (step S102).

In the document setting UI, in the present embodiment, as illustrated in the UI display in FIG. 6, it is possible to select a document type from four types, namely, "general document", "thin general document", "horizontally long slips", and "vertically long application documents and certificates". As illustrated in FIG. 6, a load detection reference value and an inclination detection reference value are set in accordance with a document type. The "general document" is assumed to be a plain paper or a thick paper, and the sensitivity to abnormality detection is set lowest. The "thin general document" is assumed to be a thin paper, and the sensitivity to abnormality detection is set the second from the bottom. The "horizontally long slips" are assumed to be horizontally long thin papers, such as A5 size horizontal, for example, delivery slips, bank application documents, and the like, and the sensitivity to abnormality detection is set the second from the top. The "vertically long application documents and certificates" are assumed to be A4-size vertically long thin papers, for example, application documents at public offices, hospitals, and the like, and the sensitivity to abnormality detection is set highest.

Referring back to FIG. 5, when the document type is set in step S102, the controller 40 starts the feed operation of the document (step S103). In this regard, after starting the document feed operation, general jam determination is performed in parallel in addition to the load detection and the inclination detection described later. The jam determination is made such that even when the feed roller 14 is rotated a predetermined amount after starting drive of the feed roller 14, if the first document detection section 31 (FIG. 2 and FIG. 3) does not detect the document front end, a jam occurrence is determined. Also, when the feed roller 14 is rotated a predetermined amount, if the second document detection section 32 (FIG. 2, FIG. 3) does not detect the document front end, a jam occurrence is determined.

In this regard, a broken line S1 in FIG. 3 illustrates the front end position of the document P mounted on the document mounting section 11 before starting the feed operation. The front end of the document P mounted on the document mounting section 11 is regulated by a regulation member not illustrated in the figure so that the front end position is located at the position S1. When the feed operation is started, the regulation member moves to a retreat position. Also, a broken line S2 in FIG. 3 is the upstream end position of the guide faces U1 and U2 of the edge guide 12. A description will be given later of the upstream end position S2.

Next, when the controller 40 starts the feed operation of the document (step S103), the controller 40 performs the load detection (steps S104 to S106) and the inclination detection (steps S110 and S111) in parallel. The load detection (step S104) is the processing that obtains the drive current of the transport roller motor 46 (FIG. 4), and is capable of being executed at a predetermined time intervals, for example. When the controller 40 obtains the drive current of the transport roller motor 46 (FIG. 4), the controller 40 determines whether or not the drive current exceeds the reference value (step S105). As described with reference to FIG. 6, the reference value is a value in accordance with a document type set by the user.

When the drive current of the transport roller motor 46 (FIG. 4) exceeds the reference value (Yes in step S105), the controller 40 stops all the motors (step S107), and displays an alert stating that a transport abnormality has occurred on the operation panel 7 (FIG. 1 and FIG. 4) (step S102). In this regard, when a scan instruction has been issued from a scanner driver operated by the external computer 90 (FIG. 4), an alert is issued to the UI of the external computer 90 (FIG. 4). When the drive current of the transport roller motor 46 (FIG. 4) is less than the reference value (No in step S105), the processing of steps S104 and S105 is repeated until one piece of the document scan is completed (No in step S106). When one piece of the document scan is completed (Yes in step S106), a determination is made as to whether or not the next page exists (step S109). If the next page exists (Yes in step S109), the processing returns to step S103 as illustrated by a sign A. If the next page does not exist (No in step S109), the abnormality detection processing is terminated.

On the other hand, in the inclination detection performed in parallel with the load detection, an inclination angle θ of the document P is obtained (step S110), and a determination is made as to whether or not the inclination angle θ exceeds the reference value (step S111). As described with reference to FIG. 6, the reference value is a value set by a user in accordance with the document type. When the inclination angle θ is less than the reference value (No in step S111), the inclination detection on one piece of the document P is completed, and the processing proceeds to step S109 described above. When the inclination angle θ exceeds the reference value (Yes in step S111), the controller 40 stops all the motors (step S112) and displays an alert stating that a transport abnormality has occurred on the operation panel 7 (FIG. 1 and FIG. 4) (step S113).

In this regard, in the embodiment described above, the inclination detection is performed one time based on the read data of the document front end area. However, the inclination detection may be performed repeatedly as the document transport proceeds.

In the following, a description will further be given of the load detection reference value and the inclination detection reference value illustrated in FIG. 6. The load detection reference value "high" or "low" illustrated in FIG. 6 means a relative value. That the load detection reference value is relatively low means that a smaller increase in the load of the transport roller motor 46 (FIG. 4) causes the detection section to determine as abnormality than when the load detection reference value is relatively high. That is to say, this means that the detection sensitivity is high. In this regard, the load detection reference value may be an absolute value or a rise value from a predetermined state. In this case, as a predetermined state, it is possible to use, for example, the drive state of the transport roller motor 46 (FIG. 4) at the time of not transporting the document P.

The inclination detection reference value "high", "medium", or "low" means a relative value in the same manner. That the inclination detection reference value is relatively low means that a smaller inclination of the document P causes the detection section to determine as abnormality than when the inclination is relatively high. That is to say, this means that the detection sensitivity is high. In this regard, it is possible to determine the inclination detection reference value based on the state in which the edge guide 12 is positioned to meet the document size or the state in which the edge guide 12 is positioned at the outermost position, that is to say, the full open state.

It is possible to obtain the inclination detection reference value, for example, based on the gap between the pair of edge guides 12 and the X-direction occupied width of the document P when the document P is inclined. In FIG. 7, a width Xh indicates a protrusion amount of the inclined document P with respect to the gap between the pair of edge guides 12. When the width Xh becomes large, a crease occurs on the document P, and a transport abnormality is likely to arise. In the document P having a possibility of causing a transport abnormality when the width Xh exceeds an Xh max, it is possible to express an inclination detection reference value θs by the following expression (1).

$$[Xp]\cos\theta s + [Yp]\sin\theta s = [Xg] + [Xh\ \max] \tag{1}$$

In this regard, Xp denotes the X-direction length of the document P in the state of having no inclination, Yp denotes the Y-direction length of the document P in the state of having no inclination, and Xg is the X-direction gap of the edge guide 12. For example, assuming that Xg=225 mm in the full open state of the edge guide 12, and Xh max is 6 mm, the inclination detection reference value θs becomes 4° in the case of A4 size vertically set, the inclination detection reference value θs becomes 9° in the case of A5 size horizontally set, the inclination detection reference value θs becomes 12° in the case of B5 size vertically set, and the inclination detection reference value θs becomes 20° in the case of A5 size vertically set.

As described above, it is possible for the controller 40 of the scanner 1A according to the present embodiment to obtain information on the document type and an inclination detection reference value with respect to the inclination of the image data obtained from the reader 20, which is set in accordance with the document type. When the inclination angle θ of the image data exceeds an inclination detection reference value in accordance with the document type, the transport roller motor 46 is stopped. Accordingly, it is possible to suppress an erroneous determination of a transport abnormality on a document that is originally hard to cause the occurrence of a transport abnormality by using an inclination detection reference value in accordance with the document type. In this regard, "erroneous determination" means that although the document P is in a state of allowing to be transported, a determination is made to be abnormal.

Also, in the present embodiment, the inclination detection reference value is set to be higher as the transport direction length of the document P is shorter. This is revealed by the difference of the inclination detection reference value between "horizontally long slips" and "vertically long application documents and certificates" in FIG. 6. That is to say, when the transport direction length of the document P is short, the time period for keeping in contact with the edge guide 12 is short, and thus a transport abnormality is hard to occur. Accordingly, by increasing the inclination detection reference value as the transport direction length of the document P is shorter, it is possible to suppress an erroneous determination on the document P that is hard to cause a transport abnormality, and to improve the convenience of a user.

In this regard, the first document, which has a transport-direction back end positioned upstream of the transport-direction back end (sign 12*c* in FIG. 3) of the edge guide 12 when mounted on the document mounting section 11, has a long time period while the document P keeps in contact with the edge guide 12, and thus a transport abnormality is likely to occur. On the contrary, the second document, which has a transport-direction back end positioned downstream of the transport-direction back end 12*c* of the edge guide 12 when mounted on the document mounting section 11, has a short time period while the document P keeps in contact with the edge guide 12, and thus a transport abnormality is unlikely to occur. Accordingly, it is suitable that the inclination detection reference value for the second document is higher than the inclination detection reference for the first document. Thereby, it is possible to suppress an erroneous determination on the second document, which is relatively harder to cause a transport abnormality than the first document, and to improve the convenience of a user.

Also, in the present embodiment, it is possible for the controller 40 to obtain a load detection reference value for the load torque of the transport roller motor 46 which is set in accordance with the document type in addition to an inclination detection reference value. When the inclination of the image data exceeds an inclination detection reference value in accordance with the document type, or when the load torque exceeds a load detection reference value in accordance with the document type, the controller 40 stops the transport roller motor 46. Accordingly, it is possible to handle the case of causing a transport abnormality without the occurrence of the inclination of the document P, and to reliably suppress giving damage to the document P having a transport abnormality.

Also, in the present embodiment, the load detection reference value is set higher as the rigidity of the document P is higher. This is revealed in the difference of the load detection reference values between "general document" and "thin general document" in FIG. 6. That is to say, the load torque of the transport roller motor 46 at the time of normal transport is likely to become higher as the rigidity of the document P is higher. Thus the load detection reference value is set higher as the rigidity of the document P is higher. Thereby it is possible to suppress an erroneous determination on the document P having a high rigidity.

Also, the scanner 1A is provided with an operation panel 7 (FIG. 1 and FIG. 4) as an input reception section that receives an instruction input from a user. Thus, it is possible for the controller 40 to change an abnormality determination execution mode (Yes in step S101 in FIG. 5), in which stop control of the transport roller motor 46 is performed in accordance with the inclination of the image data and the load torque of the transport roller motor 46 based on the information set via the operation panel 7, and an abnormality determination hold mode (No in step S101 in FIG. 5) in which stop control of the transport roller motor 46 is not performed in accordance with the inclination of the image data and the load torque. Accordingly, it is possible to handle demands that do not necessitate an abnormality determination, and to improve the convenience of the user.

Figure 5:
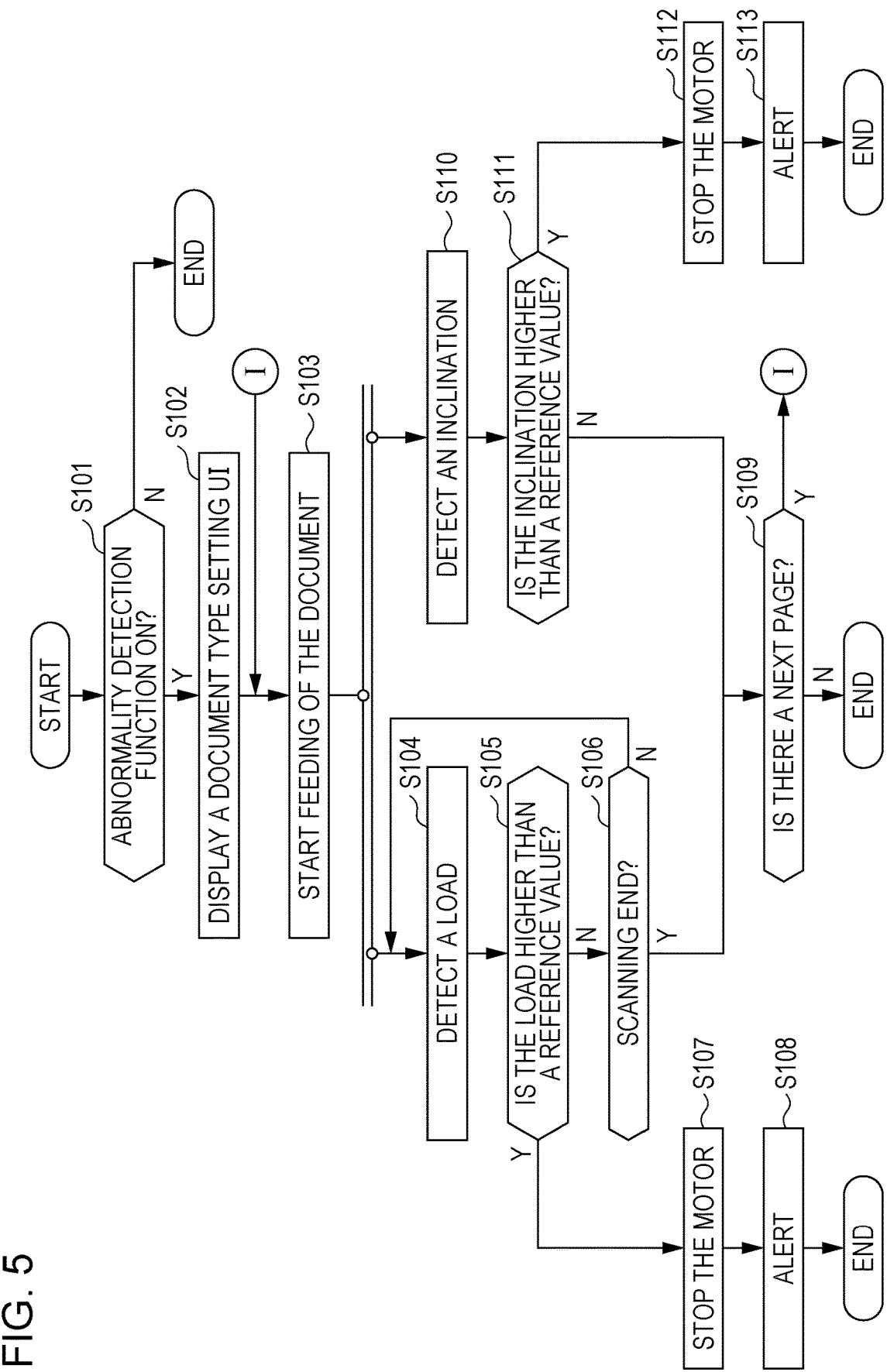
FIG. 5 is a flowchart of abnormality determination processing.

Also, when the controller 40 receives a read execution instruction of the document P in the abnormality determination execution mode, the controller 40 displays a UI for setting a document type on the operation panel 7 (in step S102 in FIG. 5). As a result, it is possible for the controller 40 to correctly obtain the information on the document type, and to more reliably suppress an erroneous determination.

In this regard, in the embodiment described above, a user sets the document type via the operation panel 7. However, the controller 40 may automatically obtain the document type by using the various sensors. For example, the scanner 1A includes the double feed detection section 30 as a medium detection section as illustrated in FIG. 2 to FIG. 4. The output value of the intensity of the ultrasonic wave output from the double feed detection section 30 changes in accordance with the thickness of the document P. The rigidity of the document P becomes higher as the thickness of the document P is higher, and thus it is possible to obtain the rigidity of the document P by the output value of the double feed detection section 30. Accordingly, it is possible to change load detection reference value depending on the output of the double feed detection section 30.

Figure 8:
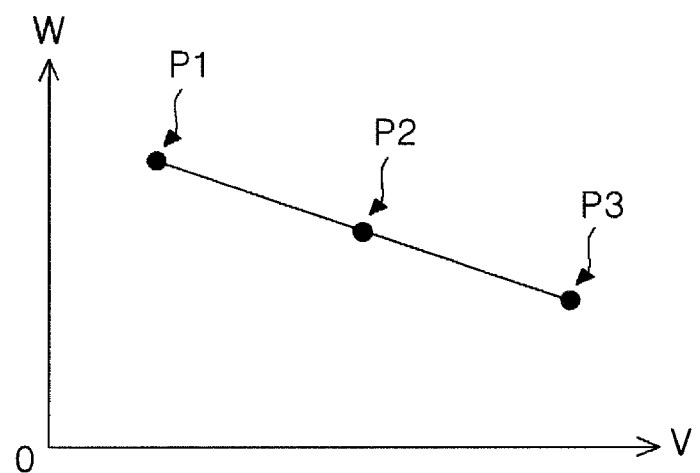
FIG. 8 is a graph illustrating a relationship between a reference value of load detection and an output value of an ultrasonic wave for each document type.

FIG. 8 illustrates an example thereof. In FIG. 8, the load detection reference value is indicated on the vertical axis W, and the output value of the double feed detection section 30 is indicated on the horizontal axis V. In FIG. 8, a plot P1 illustrates a thick paper, a plot P2 illustrates a plain paper, and a plot P3 illustrates a thin paper respectively. As illustrated in FIG. 8, the output value V of the double feed detection section 30 has a linear relationship with the load detection reference value W. Thus, by setting a calculation expression and applying the output value V of the double feed detection section 30 when the document P is actually fed, it is possible to obtain a suitable load detection reference value W in accordance with the actually fed document P each time the document P is fed. In addition, it is possible to suppress an erroneous determination without a user inputting the information on the document type, and thus to improve the convenience of the user.

In this regard, in the embodiment described above, one value is set for each of the inclination detection reference value and the load detection reference value for each document type. However, for example, a first reference value and a second reference value which is lower than the first reference value may be set, and when the detection value exceeds the first reference value first, a first alert may be output, and next when the detection value exceeds the second reference value, a second alert may be output. For example, by the first alert, the document transport, that is to say, the scan operation is once stopped. Then a UI that prompts the user to select whether to continue the scan operation or to stop the medium is displayed. If the scan continuation is selected in the UI, the scan operation is restarted. After that, if the detection value exceeds the second reference value, an alert that stops the scan operation and prompts jam handling is displayed on the UI.

In the embodiment described above, the descriptions have been given of the case in which the medium feed apparatus according to the present disclosure is applied to a scanner, which is an example of an image reading apparatus. However, it is possible to apply the medium feed apparatus according to the present disclosure to a recording apparatus, which is exemplified by a printer that includes a recording head for recording on a medium.

What is claimed is:

1. An image reading apparatus comprising:
   a document mounting section configured to mount a document;
   a feed roller configured to feed the document from the document mounting section;
   a transport roller disposed downstream of the feed roller and configured to transport the document downstream;
   a transport motor being a drive source of the transport roller;
   a reader disposed downstream of the transport roller and configured to read the document; and
   a controller configured to control the reading unit and the transport motor,
   wherein the controller is configured to obtain information on a document type and an inclination detection reference value for an inclination of image data set in accordance with the document type and obtained from the reader, and when the inclination of the image data exceeds the inclination detection reference value in accordance with the document type, the controller stops the transport motor,
   wherein the controller is configured to obtain a load detection reference value for a load torque of the transport motor set in accordance with the document type in addition to the inclination detection reference value, and
   wherein when an inclination of the image data exceeds the inclination detection reference value in accordance with the document type or when the load torque exceeds the load detection reference value in accordance with the document type, the controller stops the transport motor,
   wherein the controller is configured to perform the obtaining of load detection reference value and the obtaining of the inclination detection reference value in parallel after starting the document feed operation, and
   wherein the load detection reference value and the inclination detection reference value for feeding the thin paper are set to values larger than the load detection reference value and the inclination detection reference value for feeding plain paper or thick paper, respectively.

2. The image reading apparatus according to claim 1, wherein the inclination detection reference value becomes higher as a transport direction length of the document is shorter.

3. The image reading apparatus according to claim 1, further comprising edge guides disposed with a gap therebetween in a width direction intersecting a document feed direction and configured to guide width direction edges of the document mounted on the document mounting section, wherein
   the document type includes a first document having a back end in the transport direction in length located upstream out from a back end of the edge guides in the transport direction when mounted on the document mounting section and a second document having a back end in the transport direction in length located downstream from the back end of the edge guides in the transport direction when mounted on the document mounting section, and
   the inclination detection reference value for the second document is higher than the inclination detection reference value for the first document.

4. The image reading apparatus according to claim 1, wherein the controller is configured to perform general jam determination in parallel in addition to the load detection and the inclination detection.

5. The image reading apparatus according to claim 1, wherein the load detection reference value becomes higher as a rigidity of the document is higher.

6. The image reading apparatus according to claim 1, further comprising an input receptor configured to receive an instruction input from a user,
   wherein the controller changes between an abnormality determination execution mode in which stop control of the transport motor is performed in accordance with the inclination of the image data and the load torque based on information set via the input receptor, and an abnormality determination hold mode in which stop control of the transport motor is not performed in accordance with the inclination of the image data and the load torque.

7. The image reading apparatus according to claim 6, wherein when the controller receives a read execution instruction of a document in the abnormality determination execution mode, the controller displays a user interface for setting a document type in the input receptor.

8. The image reading apparatus according to claim 4, further comprising a medium detection section including a transmission section that transmits an ultrasonic wave and a reception section that receives the ultrasonic wave transmitted from the transmission section and outputs an output value in accordance with the received ultrasonic wave to the controller between the feed roller and the transport roller in a document transport path,
   wherein the controller adjusts the load detection reference value in accordance with the output value.

* * * * *